(12) United States Patent
Ozeki et al.

(10) Patent No.: US 7,784,586 B2
(45) Date of Patent: Aug. 31, 2010

(54) NOISE REDUCTION STRUCTURE FOR HYBRID VEHICLE

(75) Inventors: Takashi Ozeki, Saitama (JP); Kyosuke Kitayama, Saitama (JP); Yoshiaki Tsukada, Saitama (JP); Haruomi Sugita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 11/169,669

(22) Filed: Jun. 30, 2005

(65) Prior Publication Data

US 2006/0037813 A1 Feb. 23, 2006

(30) Foreign Application Priority Data

Aug. 17, 2004 (JP) ............................. 2004-237120

(51) Int. Cl.
*F01N 1/08* (2006.01)
(52) U.S. Cl. .................. 181/272; 181/232; 181/212; 181/227; 181/228; 181/250; 180/309; 180/89.2; 180/296; 180/68.3; 123/184.53; 123/184.54
(58) Field of Classification Search ............... 181/272, 181/232, 212, 227, 228, 250, 249, 251, 266, 181/273, 283; 180/309, 89.2, 296, 68.3, 180/219, 65.4; 123/184.53, 184.54, 184.55, 123/184.56, 184.57
See application file for complete search history.

(56) References Cited

U.S. PATENT DOCUMENTS

| | | | | |
|---|---|---|---|---|
| 2,070,543 A * | 2/1937 | Hollerith et al. ............ 181/266 |
| 4,793,293 A * | 12/1988 | Minami ...................... 123/41.7 |
| 4,815,554 A | 3/1989 | Hara et al. |
| 5,326,317 A * | 7/1994 | Ishizu et al. ................. 454/354 |
| 5,474,144 A * | 12/1995 | Tarng ........................... 180/76 |
| 5,501,292 A * | 3/1996 | Kawashima et al. ........ 180/220 |
| 6,155,366 A | 12/2000 | Lin |
| 6,276,481 B1 * | 8/2001 | Matsuto et al. ............. 180/220 |
| 6,831,382 B1 * | 12/2004 | Lyle et al. ....................... 310/89 |
| 7,249,648 B2 * | 7/2007 | Michisaka et al. .......... 180/219 |
| 2002/0185323 A1 * | 12/2002 | Tsutsumi et al. ............ 180/219 |
| 2004/0041475 A1 * | 3/2004 | Cichetti, Sr. ................. 310/58 |

FOREIGN PATENT DOCUMENTS

EP    1 012 032 B1    1/2002

(Continued)

*Primary Examiner*—Jeffrey Donels
*Assistant Examiner*—Forrest M Phillips
(74) *Attorney, Agent, or Firm*—Birch, Stewart, Kolasch & Birch, LLP

(57) ABSTRACT

A noise reduction structure for a hybrid vehicle in which a cover covers at least part of an air intake system connected to an engine capable of giving power to a driving wheel, an exhaust muffler constituting part of an exhaust system connected to the engine, and an electric motor capable of giving power to the driving wheel. When at least part of the air intake system, the exhaust muffler constituting part of an exhaust system, and the electric motor is covered with the common cover, heat generated by the exhaust muffler is prevented from affecting the electric motor. The rotational axis of the electric motor extends in a longitudinal direction of a body frame and is disposed forwardly of the central position of the exhaust muffler extending in the longitudinal direction.

20 Claims, 8 Drawing Sheets

FOREIGN PATENT DOCUMENTS

| | | | |
|---|---|---|---|
| EP | 1270302 A2 | | 1/2003 |
| EP | 1366977 | * | 12/2003 |
| JP | 360093111 | * | 10/1983 |
| JP | 59-176169 A | | 10/1984 |
| JP | 405187217 | * | 1/1992 |
| JP | 406248930 | * | 2/1993 |
| JP | 6-117338 A | | 4/1994 |
| JP | 8-175473 A | | 7/1996 |
| JP | 8-175474 A | | 7/1996 |
| JP | 10-297570 A | | 11/1998 |
| JP | 2000-103384 A | | 4/2000 |
| JP | 2001-130469 A | | 5/2001 |

* cited by examiner

NOISE REDUCTION STRUCTURE FOR HYBRID VEHICLE

CROSS-REFERENCE TO RELATED APPLICATION

The present application claims priority under 35 U.S.C. §119 to Japanese Patent Application No. 2004-237120, filed Aug. 17, 2004, the entire contents of which are hereby incorporated by reference.

BACKGROUND OF THE INVENTION

1. Field of the Invention

The present invention relates to noise reduction structure for a hybrid vehicle in which a cover covers at least part of an air intake system connected to an engine capable of giving power to a driving wheel, an exhaust muffler constituting part of an exhaust system connected to the engine, and an electric motor capable of giving power to the driving wheel.

2. Description of Background Art

A configuration in which at least part of an intake system of an engine and an exhaust muffler constituting part of an exhaust system are covered with a cover has been known from, e.g., Japanese Patent Laid-open No. Sho 59-176169. A hybrid vehicle configured to allow each of an engine and an electric motor to give driving force to a driving wheel has been known from, e.g., Japanese Patent Laid-open No. Hei 8-175473

The configuration disclosed by Japanese Patent Laid-open No. Sho 59-176169 is designed to suppress noise from the exhaust system and intake system of the engine by covering them with a cover. On the other hand, such noise reduction structure may be applied to the hybrid vehicle as disclosed in Japanese Patent Laid-open No. Hei 8-175473. In this case, to suppress occurrence of noise from the electric motor as a source of noise, it could be conceivable that a common cover is used to cover at least part of the air intake system of the engine and the exhaust muffler of the exhaust system as well as the electric motor. In such a case, it is desirable to prevent heat generated by the exhaust muffler from affecting the electric motor.

SUMMARY AND OBJECTS OF THE INVENTION

In view of the foregoing, the present invention has been made and it is an object of the invention is to provide noise reduction structure for a hybrid vehicle, in which at least part of an air intake system of an engine and an exhaust muffler constituting part of an exhaust system as well as an electric motor are covered with a common cover so that heat generated by the exhaust muffler may be prevented from affecting the electric motor.

In order to achieve the above object, according to a first aspect of the present invention, a noise reduction structure for a hybrid vehicle is provided in which a cover covers at least part of an air intake system connected to an engine capable of giving power to a driving wheel, an exhaust muffler constituting part of an exhaust system connected to the engine, and an electric motor capable of giving power to the driving wheel, and wherein a rotational axis of the electric motor extending in a longitudinal direction of the body frame is disposed forward of a central position of the exhaust muffler extending in the longitudinal direction.

In addition, according to a second aspect of the present invention, the electric motor and the exhaust muffler are disposed at respective locations to sandwich the rear wheel therebetween from both sides thereof.

Further, according to a third aspect of the present invention, the exhaust muffler includes a first expansion chamber which receives exhaust gas from the engine and a second expansion chamber which is disposed above the first expansion chamber in such a manner as to receive the exhaust gas from the first expansion chamber, and a lower portion of the first expansion chamber is located at a position close to a lower opening edge of the cover.

According to the first aspect of the present invention, at least part of the air intake system, the exhaust muffler constituting part of the exhaust system, and the electric motor are covered with the common cover. Therefore, a noise reduction effect can be achieved that noise occurring in the air intake system and the exhaust system is prevented from leaking to the outside as much as possible. In addition, another noise reduction effect can be achieved that also noise occurring in the electric motor is prevented from leaking to the outside as much as possible. Furthermore, the rotational axis of the electric motor extending in a longitudinal direction of the body frame is disposed forward of a central position of the exhaust muffler extending in the longitudinal direction. Therefore, heat generated by the exhaust muffler can be prevented from affecting the electric motor as much as possible.

According to the second aspect of the present invention, the electric motor and the exhaust muffler are disposed at respective locations to sandwich the rear wheel therebetween from both sides thereof. Therefore, heat generated by the exhaust muffler can be prevented from affecting the electric motor more effectively.

According to the third aspect of the present invention, the exhaust muffler can be cooled with flowing air, whereby the influence of the heat from the exhaust muffler on the electric motor can be further suppressed to a low level.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
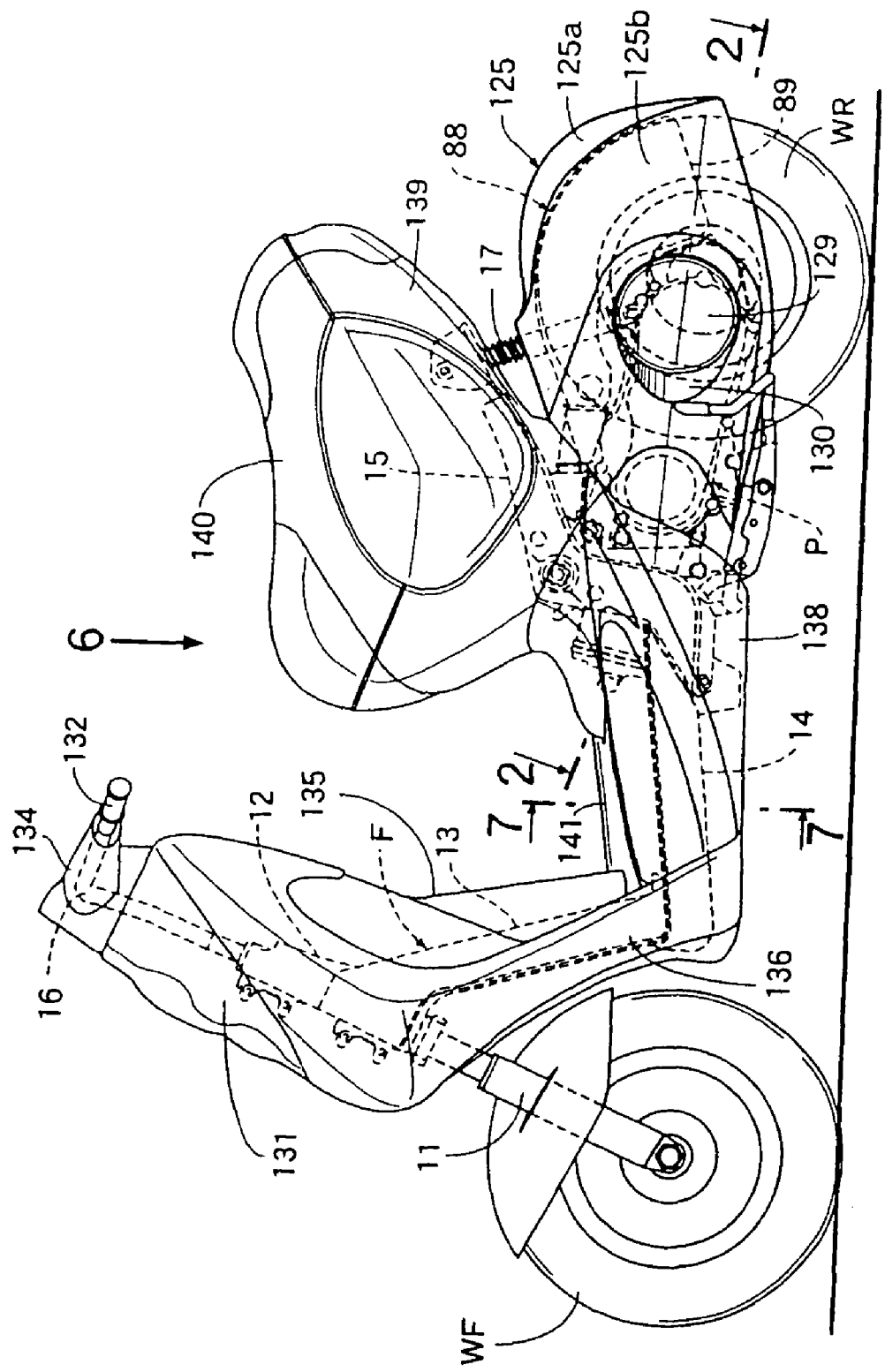
FIG. 1 is a side view of a motorcycle to which the invention is applied.

FIG. 1 illustrates a scooter type motorcycle configured as a hybrid-type, having a body frame F. The body frame F includes a head pipe 12, a front frame 13, a pair of intermediate frames 14, and a pair of rear frames 15. The head pipe 12 steerably supports a front fork 11 whose lower end supports a front wheel WF. The front frame 13 extends from the head pipe 12 rearward and downward. The pair of intermediate frames 14 branches to the right and left at the lower end of the front frame 13 and extends therefrom rearward and substantially horizontally. The pair of rear frames 15 extends from the rear end of the intermediate frame 14 rearward and upward. A steering handlebar 16 is connected to the upper part of the front fork 11.

The front part of a power unit P is swingably supported by the longitudinally intermediate portions of the pair of rear frames 15. A rear cushion 17 is disposed between one of the rear frames 15 and the power unit P. A driving wheel or rear wheel WR is supported by the rear portion of the power unit P.

Figure 2:
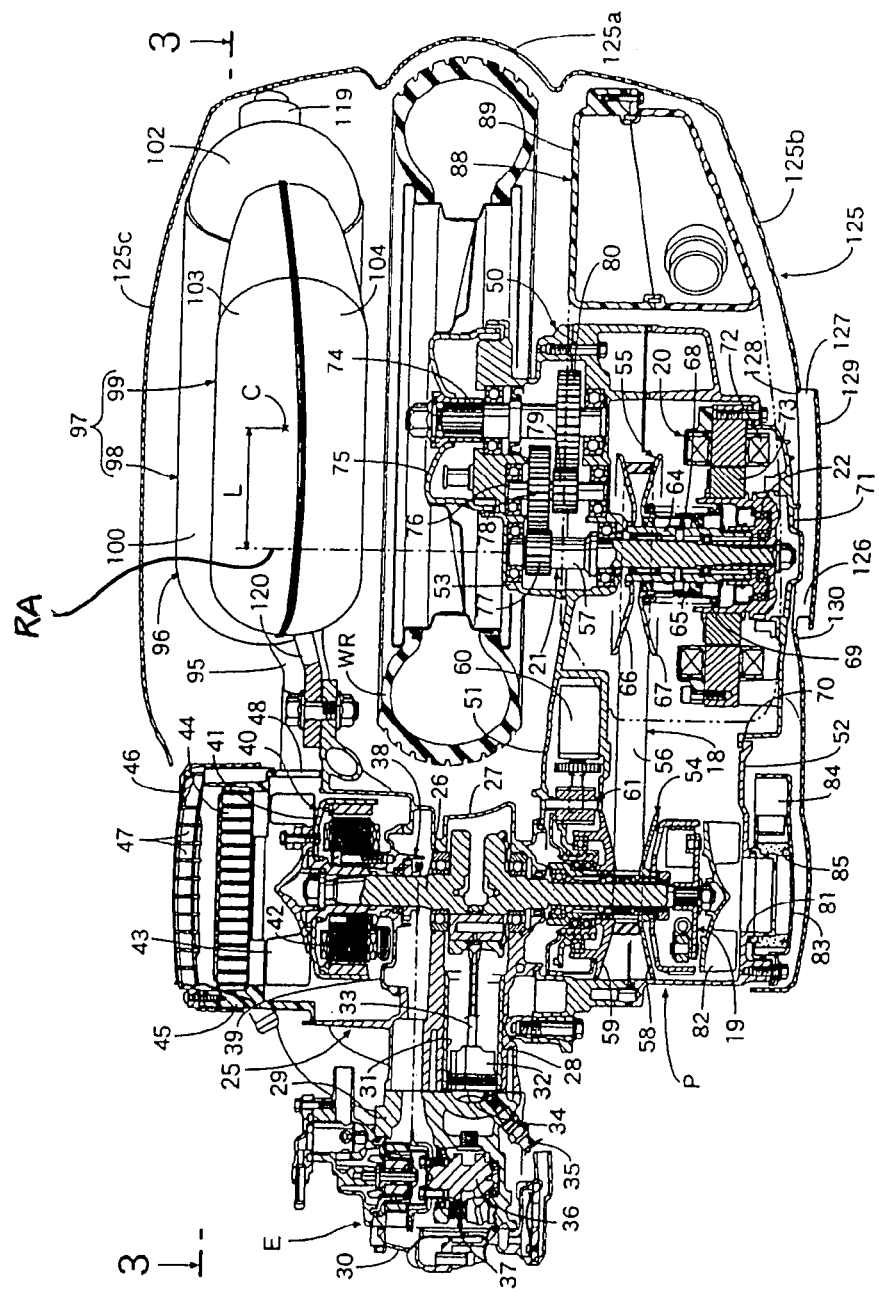
FIG. 2 is a cross-sectional view taken along line 2-2 of FIG. 1.

Referring to FIG. 2, the power unit P includes a 4-cycle engine E, a V-belt type continuously variable transmission 18, a starting clutch 19, an electric motor 20, a power transmission means 21, and a one-way clutch 22. The 4-cycle engine E is composed of, e.g., a water-cooled single cylinder for providing a driving force to the rear wheel WR. The continuously variable transmission 18 is adaptable to continuously vary the output of the engine E. The starting clutch 19 is interposed between the engine E and the continuously variable transmission 18. The electric motor 20 can provide a driving force to the rear wheel WR. The power transmission means 21 is provided between the electric motor 20 and the rear wheel WR. The one-way clutch 22 is interposed between the continuously variable transmission 18 and the power transmission means 21.

The engine body 25 of the engine E includes a crankcase 27, a cylinder block 28, a cylinder head 29 and a head cover 30. The crankcase 27 rotatably supports a crankshaft 26 having a rotational axis parallel to the rotational axis of the rear wheel WR. The cylinder block 28 is coupled to the crankcase 27. The cylinder head 29 is coupled to the cylinder block 28 on a side opposite to the crankcase 27. The head cover 30 is coupled to the cylinder head 29 on a side opposite to the cylinder block 28.

The cylinder block 28 is postured such that the axis of a cylinder bore 31 provided in the cylinder block 28 extends along the traveling direction of the motorcycle slightly upward and forward as well as substantially horizontally. A piston 32 is slidably fitted in the cylinder bore 31. The piston 32 is connected to the crankshaft 26 via a connecting rod 33.

A combustion chamber 34 is defined between the cylinder head 29 and the piston 32. An ignition plug 35 facing the combustion chamber 34 is attached to the left side surface of the cylinder head 29, facing the front of the motorcycle's traveling direction. A valve mechanism 37 is disposed between the cylinder head 29 and the head cover 30. The valve mechanism 37 includes a camshaft 36 which has an axis parallel to the axis of the crankshaft 26 and which is supported by the cylinder head 29 for turning. The valve mechanism 37 opens and closes an intake valve and an exhaust valve, not shown, in order to control the intake of air/fuel mixture and the exhaust of gas to and out of the combustion chamber 34. A timing-transmission means 38 is attached to the right end of the camshaft 36, facing the front of the motorcycle's traveling direction. This timing-transmission means 38 reduces rotational power from the camshaft 26 to one-second for transmission.

The right end portion of the crankshaft 26 rotatably passes, in a liquid-tight manner, through the crankcase 27 and a mounting base 39 attached to the right side surface of the cylinder block 28. An outer rotor 41 is secured to the projection of the crankshaft 26 extending from the mounting base 39. The outer rotor 41 and an inner stator 42 cooperatively constitute an ACG stator motor 40. The inner stator 42 is secured to the mounting base 39 in such a manner as to be enclosed with the outer rotor.

A cooling fan 43 is fixedly attached to the crankshaft 26 at a position lateral to the ACG stator motor 40. A radiator 44 is disposed at a position sandwiching the cooling fan 43 between the ACG starter motor 40 and the radiator 44. The radiator 44 is mounted to the crankcase 27 and the cylinder block 28 through a shroud 45 enclosing the cooling fan 43. The radiator 44 is covered with a radiator cover 46 attached to the shroud 45. The radiator cover 46 is formed with a grille 47 facing the radiator 44. The grille 47 is adapted to introduce cooling air from the outside by the cooling fan 43. In addition, the shroud 45 is formed with an outlet port 48 lateral to the cooling fan 43. The outlet port 48 is adapted to exhaust the air having passed through the radiator 44 to the outside.

The V-belt type continuously variable transmission 18 is housed in a transmission case 50. This case 50 is coupled to the engine body 25 to cover part of the engine body 25 from the side thereof and extends to a position on the left side of the rear wheel WR. The case 50 consists of an inner case 51 continuous with the crankcase 27, an outer case 52 covering the inner case 51 from the outside, and a gear case 53 fastened to the rear portion of the inner case 51 on a side opposite to the outer case 52.

The continuously variable transmission 18 includes a drive pulley 54, a driven pulley 55 and an endless V-belt 56. The drive pulley 54 is carried on an end of the crankshaft 26 entering the front portion of the transmission case 50 from the crankcase 27. The driven pulley 55 is carried on an output shaft 57. This output shaft 57 has an axis parallel to the crankshaft 26 and is rotatably supported by the inner case 51 and the gear case 53. The V-belt 56 is adapted to transmit power from the drive pulley 54 to the driven pulley 55.

The drive pulley 54 includes a stationary pulley half 58 and a movable pulley half 59. The stationary pulley half 58 is carried on the crankshaft 26 via the starting clutch 19. The movable pulley half 59 is capable of coming close to or apart from the stationary pulley half 58. The V-belt 56 is wound around the belt groove defined between the stationary pulley half 58 and the movable pulley half 59. Power used to axially move the movable pulley half 59 is transmitted thereto so as to vary the width of the belt groove. Specifically, the power is transmitted to the movable pulley half 59 via a reduction gear mechanism 61 from the control electric motor 60 housed fixedly in the transmission case 50.

The starting clutch 19 is a centrifugal clutch that transmits power from the crankshaft 26 to the stationary pulley half 58 when the rotation number of the crankshaft 26 reaches a required value or more, e.g., 3000 rpm or more.

The driven pulley 55 includes an inner cylinder 64, an outer cylinder 65, a stationary pulley half 66, a movable pulley half 67, a torque cam mechanism 68, and a spring. The inner cylinder 64 coaxially encloses the output shaft 57 for rotation relative thereto. The outer cylinder 65 allows the inner cylinder 64 to be slidably fitted therein for rotation relative thereto around its axis and for movement relative thereto along the axis. The stationary pulley half 66 is fixed to the inner cylinder

64. The movable pulley half 67 is fixed to the outer cylinder 65, facing the stationary pulley half 66. The torque cam mechanism 68 is disposed between the inner cylinder 64 and the outer cylinder 65 so as to apply an axial power component to between both the pulley halves 66, 67 in accordance with a phase difference of relative rotation between the movable pulley half 67 and the stationary pulley half 66. The spring 69 is compressively disposed between the inner cylinder 64 and the movably pulley half 67 to provide a spring force allowing the movable pulley half 67 to come close to the stationary pulley half 66.

With this configuration, a distance between the stationary pulley half 66 and movable pulley half 67 in the driven pulley 55 is determined by a balance among forces; an axial force generated by the torque cam mechanism 68, an axial elastic force generated by the spring 69, and a force from the V-belt 56 acting to increase the distance between the stationary pulley half 66 and the movable pulley half 67. Bringing the movable pulley half 59 into close to the stationary pulley half 58 in the drive pulley 54 increases a radius of the V-belt 56 wound around the drive pulley 54. This reduces a radius of the V-belt 56 wound around the driven pulley 55.

The electric motor 20 capable of providing power to the rear wheel WR includes an outer stator 72 and an inner rotor 73. The outer stator 72 is secured to a motor case 71, which is fixed to an outer case 52 in such a way as to close an opening 70 provided at the rear portion of the outer case 52 in the transmission case 50. The inner rotor 73 is carried on the output shaft 57 in such a manner as not to be rotated with respect to each other. In operation, the electric motor 20 can transmit the rotational power to the output shaft 57.

The one-way clutch 22 is interposed between the inner cylinder 64 of the driven pulley 55 and the inner rotor 73 of the electric motor 20. The one-way clutch 22 can transmit power to the inner rotor 73 from the inner cylinder 64 so as to activate the electric motor 20 as a generator in a state where the output of the engine E is transmitted to the output shaft 57 through the continuously variable transmission 18.

An axle 74 is rotatably supported by the inner case 51 and the gear case 53. A hub 75 of the rear wheel WR is fixedly secured to an end of the axle 74 projecting from the transmission case 50.

The power transmission means 21 is a reduction gear train disposed between the output shaft 57 and the axle 74. This power transmission means 21 is composed of a first gear 77, a second gear 78, a third gear 79, and a fourth gear 80. The first gear 77 is carried on the output shaft 57. The second gear 78 is carried on an intermediate shaft 76 and meshes with the first gear 77. The intermediate shaft 76 is disposed in parallel with the output shaft 57 and the axle 74 and carried for rotation on the inner case 51 and the gear case 53. The third gear 79 is carried on the intermediate shaft 76. The fourth gear 80 meshes with the third gear 79 and is carried on the axle 74.

An air intake port 81 adapted to take cooling air into the transmission case 50 is provided in a sidewall of the outer case 52 in the transmission case 50, at a portion facing the driving pulley 54. A cooling fan 82 is attached to the end of the crankshaft 26 at a position lateral to the drive pulley 54 in order to distribute the cooling air taken from the air intake port 81.

A filter case 83 is attached to the outer surface of the outer case 52 to cover the air intake port 81 from the outside. Outside air is introduced into the filter case 83 from an intake port 84 provided in the filter case 83. The introduced air is purified by passing through a filter element 85 placed in the filter case 83. The purified air is taken into the transmission case 50 from the air intake port 81.

Figure 3:
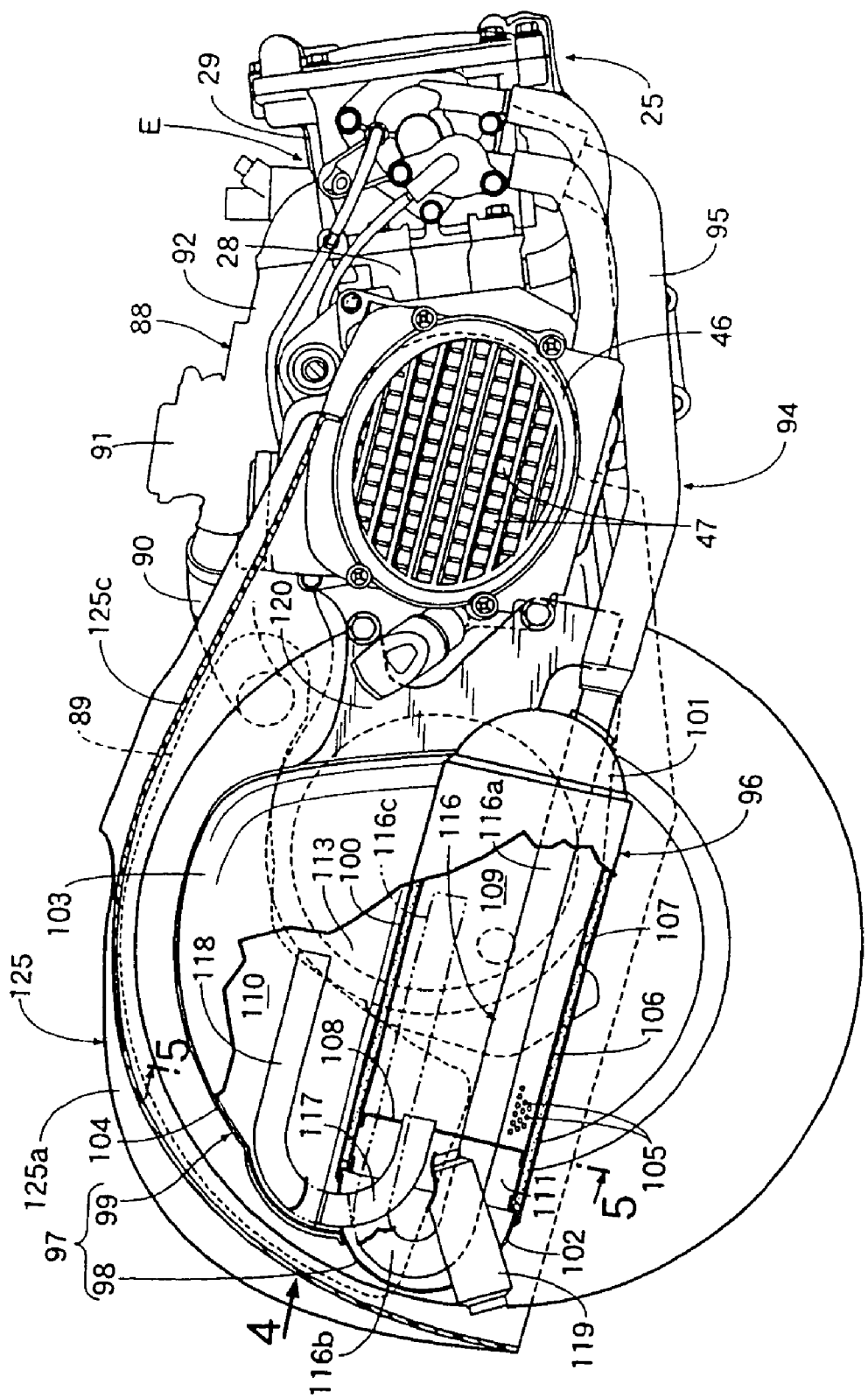
FIG. 3 is a cross-sectional view taken on line 3-3 of FIG. 2.

Referring to FIG. 3 as well as FIGS. 1 and 2, the intake system 88 of the engine E includes an air cleaner 89 for purifying outside air, an air intake hose 90 for introduction of the purified air from the air cleaner 89, a carburetor 91 connected to the downstream end of the air intake hose 90, and an intake pipe 92 connecting the carburetor 91 and the upper side surface of the cylinder head 29 in the engine E. This system 88 is disposed over and backward of the power unit P on the left side of the rear wheel WR, facing the forward of the motorcycle's traveling direction.

The exhaust system 94 of the engine E includes an exhaust pipe 95 and an exhaust muffler 96. The exhaust pipe 95 is at its upstream end connected to the lower side surface of the cylinder head 29. In addition, the exhaust pipe 95 extends leftward and then rearward on the left side of the rear wheel WR, facing the forward of the motorcycle's traveling direction. The exhaust muffler 96 is disposed on the right side of the rear wheel WR so as to sandwich the rear wheel WR between the power unit P and the exhaust muffler 96. In addition, the exhaust muffler 96 is connected to the downstream end of the exhaust pipe 95.

Figure 4:
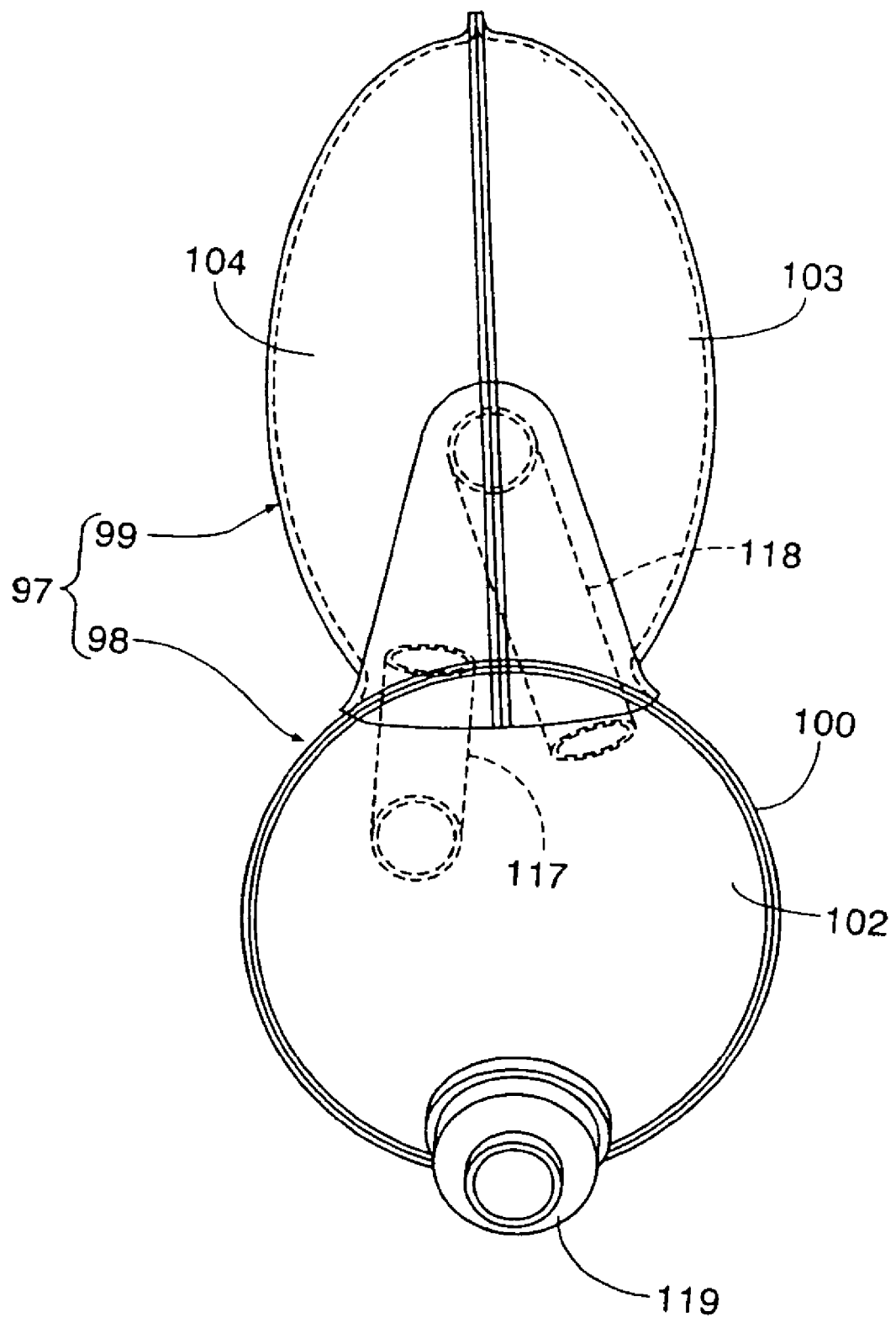
FIG. 4 is a rear view of an exhaust muffler as viewed from a direction of arrow 4 in FIG. 3.
Figure 5:
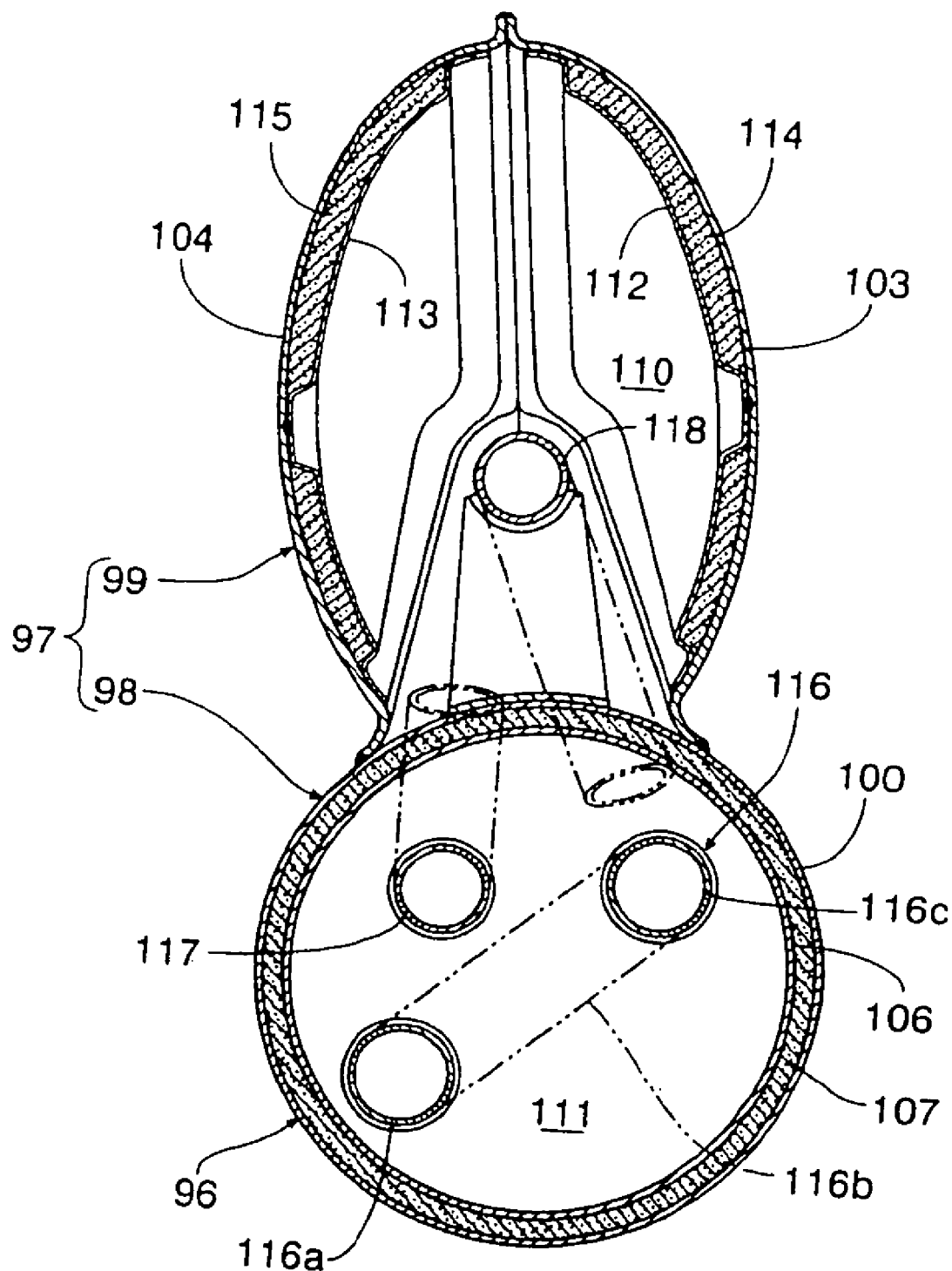
FIG. 5 is a cross-sectional view taken along line 5-5 of FIG. 3.

Referring to FIGS. 4 and 5 as well as FIGS. 1 to 3, the casing 97 of the exhaust muffler 96 is composed of a first case 98 and a second case 99. The first case 98 is made up of a cylindrical body 100 extending in the longitudinal direction and semispherical end caps 101, 102 that respectively close the front and rear ends of the cylindrical body 100. The second case 99 is made up of a pair of case halves 103, 104 that are joined together along a joint surface extending along the longitudinal direction of the motorcycle. In addition, the second case 99 is joined to the upper portion of the first case 98. The second case 99 is formed to expand upward from the first case 98 as viewed laterally.

An inner tube 106 formed with a large number of small holes 105 is concentrically inserted into and secured to the cylindrical body 100 of the first case 98. An acoustic material 107 fills up a space between the cylindrical body 100 and the inner tube 106. A partition disk 108 is at its circumference secured to the rearward inner surface of the inner tube 106. This partition disk 108 divides the first case 98 into a first front expansion chamber 109 and a third rear expansion chamber 111.

Inner walls 112, 113 are, at a plurality of locations and the outer circumferential edges thereof, welded to the inner surfaces of the case halves 103, 104, respectively, which constitute the second case 99. The inner walls 112, 113 are each formed with a large number of small holes. An acoustic member 114 fills up a space between the case half 103 and the inner wall 112. Similarly, an acoustic member 115 fills up a space between the case half 104 and the inner wall 113. In this way, a second expansion chamber 110 defined by the inner walls 112, 113 and the upper outer surface of the first case 98 is formed in the second case 99 at a location above the first and third expansion chambers 109, 111.

The exhaust gas directed by the exhaust pipe 95 is further introduced by a first conduit 116 into the first expansion chamber 109. The first conduit 116 is composed of first and second straight portions 116a, 116c, and a bent portion 116b, which are integral with one another. The first and second straight portions 116a, 116c extend parallel to the axis of the cylindrical body 100 in the first case 98. The bent portion 116b extends in a U-shaped manner to join the first straight portion 116a with the second straight portion 116c. The first straight portion 116a passes through the end cap 101 at the front end of the first case 98 and the lower portion of the partition disk 108 and extends in the first expansion chamber 109 in parallel to the axis of the first case 98. The upstream end of the first straight portion 116a is coupled to the downstream end of the exhaust pipe 95. The second straight portion 116c passes through the upper portion of the partition disk 108 and extends forwardly in the first expansion chamber 109. In addition, the downstream end of the second straight portion 116c is open. The bent portion 116b connects the downstream end of the first straight portion 116a and the upstream end of the second straight portion 116c, and is disposed in the third expansion chamber 111.

The exhaust gas that has been introduced into the first expansion chamber 109 through the first conduit 116 is introduced into the second expansion chamber 110 through a second conduit 117. This second conduit 117 is bent in a substantially C-shape in such a manner as to pass through the end cap 102 at the rear end of the first case 98 and the partition disk 108. The upstream end of the second conduit 117 is open to the first expansion chamber 109. The downstream end of the second conduit 117 is open to the second expansion chamber 110.

The exhaust gas that has been introduced into the second expansion chamber 110 through the second conduit 117 is introduced into the third expansion chamber 111 through the third conduit 118. The third conduit 118 is formed in a substantially J-shape in such a manner that the upstream end thereof disposed in the third expansion chamber 111 is open forwardly. The third conduit 118 passes through the end cap 102 at the rear end of the first case 98 in such a manner that the downstream end thereof is open to the third expansion chamber 111. The exhaust gas in the third expansion chamber 111 is discharged to the outside through a discharge pipe 119 passing through the end cap 102 at the rear end of the first case 98.

Incidentally, the casing 97 of the exhaust muffler 96 is provided with a support bracket 120 projecting forward therefrom. The bracket 120 is secured to the engine body 25. In this way, the exhaust muffler 96 is disposed to interpose the rear wheel WR between the exhaust muffler 96 and the electric motor 20 constituting part of the power unit P. In addition, the exhaust muffler 96 is disposed such that the central position C thereof in the longitudinal direction of the body frame F is located at a position rearward in the above longitudinal direction by a distance L from the rotational axis RA of the electric motor 20, i.e., the axis of the output shaft 57 as shown in FIG. 2.

Figure 6:
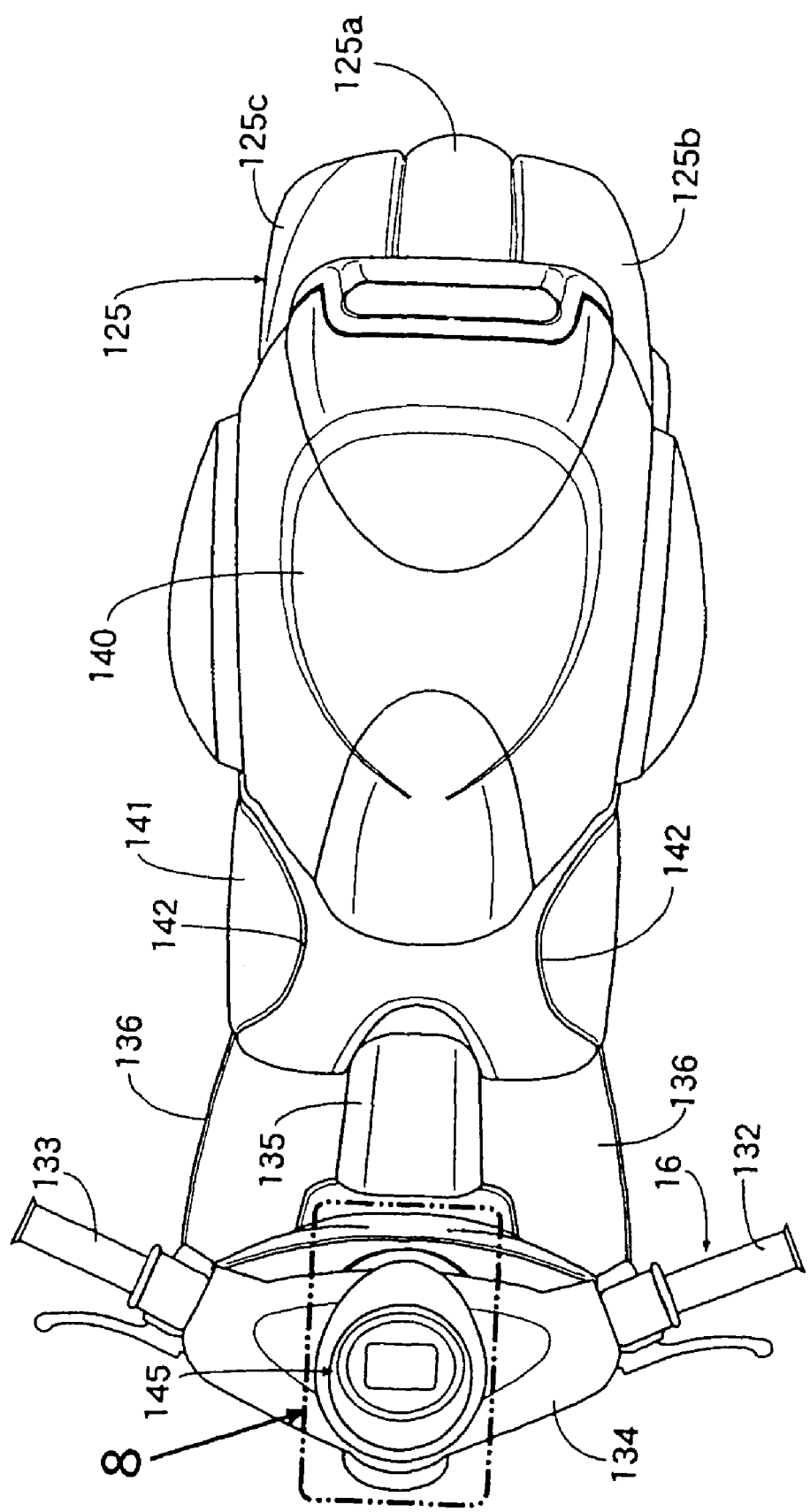
FIG. 6 is a plan view as viewed from a direction of arrow 6 in FIG. 1.

Referring to FIG. 6 as well as FIGS. 1 to 5, a common cover 125 covers the air cleaner 89, i.e., at least part of the air intake system 88, the exhaust muffler 96 constituting part of the exhaust system 94, the transmission case 50 housing the electric motor 20 of the power unit P therein, and the rear wheel WR. The cover 125 is composed of a rear fender 125a covering the rear wheel WR, a left cover portion 125b, and a right cover portion 125c, which are integral with one another. The left cover portion 125b covers the transmission case 50 of the power unit P and the air cleaner 89 of the intake system 88 and is continuous with the left side part of the rear fender 125a. The right cover portion 125c covers the exhaust muffler 96 of the exhaust system 94 and is continuous with the right side part of the rear fender 125a. The cover 125 is made of a synthetic resin.

The lower portion of the first expansion chamber 109 of the exhaust muffler 96 is disposed at a position above and close to the lower opening edge of the right cover portion 125c of the cover 125.

The electric motor 20 of the power unit P is disposed on a side of the width direction, i.e., on the left side in the embodiment, of the body frame F such that at least part of the motor case 71 is exposed to the outside from the side of the transmission case 50. A lateral surface of the cover 125 facing a side, in the width direction, of the body frame F, i.e., the left cover portion 125b is provided with air intake and exhaust vents 126, 127 in order to cool with flowing air a portion of the motor case 71 that is exposed from the transmission case 50.

To be more specific, the air intake vent 126 is provided in the left cover portion 125b of the cover 125 at a location forward of the electric motor 20 in the traveling direction of the motorcycle. The air exhaust vent 127 is provided in the left cover portion 125b at a location rearward of the electric motor 20 in the traveling direction of the motorcycle.

Incidentally, the left cover portion 125b of the cover 125 is formed with a circular opening 128 at a portion corresponding to the electric motor 20 as clearly shown in FIG. 2. In addition, a circular shield 129 is disposed integral with the left cover portion 125b so as to cover the opening 128 from the outside. The air intake vent 126 is formed between the left cover portion 125b and the front end of the shield 129. The air exhaust vent 127 is formed between the left cover portion 125b and the rear end of the shield 129.

The left cover portion 125b of the cover 125 is provided with a guide recess 130 at a portion forward of the electric motor 20 in the traveling direction of the motorcycle. The guide recess 130 is recessed inwardly such that its amount of recess is increased as it approaches the rearward, namely, the side of the shield 129, and such that its width is increased as it goes rearward. In addition, the air intake vent 126 is disposed to be continuous with the rear end of the guide recess 130.

Referring to FIGS. 1 and 6, a front cowl 131 made of a synthetic resin covers the front of the head pipe 12. A handlebar cover 134 made of a synthetic resin covers the steering handlebar 16 except grips 132 and 133 at the opposite ends thereof. A center cowl 135 made of a synthetic resin covers the back of the head pipe 12. Leg shields 136 made of a synthetic resin are disposed to be continuous with the front cowl 131 and the center cowl 135.

Figure 7:
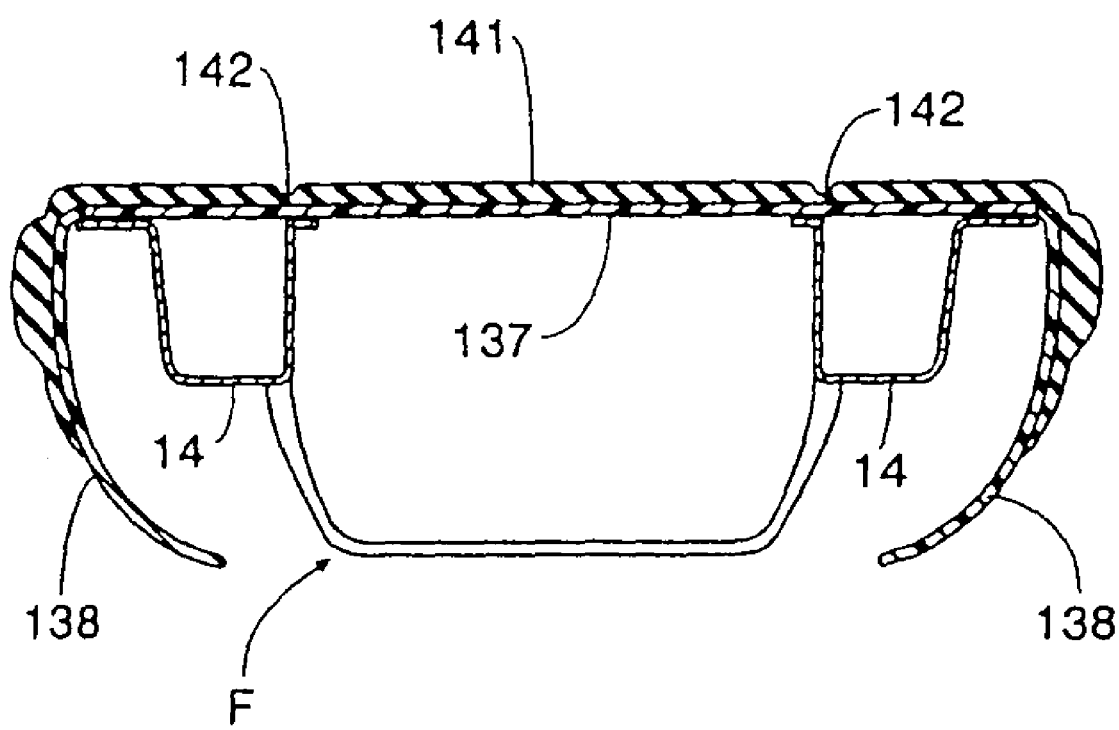
FIG. 7 is a cross-sectional view taken along line 7-7 of FIG. 1.

Referring to FIG. 7, a floor panel 137 made of a synthetic resin is disposed rearward of the center cowl 135 in such a manner as to be fixed to a pair of right and left intermediate-frames 14, which constitute part of the body frame F. Side under-cowls 138 made of a synthetic resin are joined to the sides of the floor panel 137, respectively.

The rear portion of the body frame F and a portion of the engine E are covered with a rear cover 139 made of a synthetic resin, which is supported by the rear frame 15. A rider's seat 140 is disposed on the rear cover 139 in such manner as to be openable and closable.

Incidentally, the floor panel 137 and part of the pair of right and left side under-cowls 138 joined respectively to the sides of the floor panel 137 are covered with a rubber mat 141 being elastically attached onto them. The rubber mat 141 is substantially U-shaped to be open downward in cross-section.

The rubber mat 141 can shield a fixing portion of the floor panel 137 to the intermediate frame 14 and the respective joints of the side under-cowls 138 to the floor panel 137. In addition, the rubber mat 141 makes it possible to prevent a recess or a hole from receiving water or mud, which is caused by fixing the floor panel 137 to the intermediate frame 14. Thus, it becomes possible to enhance external appearance and maintenance performance. The upper portions of the side under-cowls 138 are covered with the sides of the rubber mat 141. This provides the rubber mat 141 with a protection capability to protect the side under-cowls 138 from being scratched.

In addition, since a rider sitting on the rider's seat 140 puts his or her feet on the rubber mat 141, grip performance can be more enhanced than directly on the synthetic resin-made floor panel 137.

As shown in FIG. 6, grooves 142 adaptable to longitudinally run the water on the rubber mat 141 are formed on both the sides of the upper surface of the rubber mat 141. This improves drainage of water on the rubber mat 141.

Figure 8:
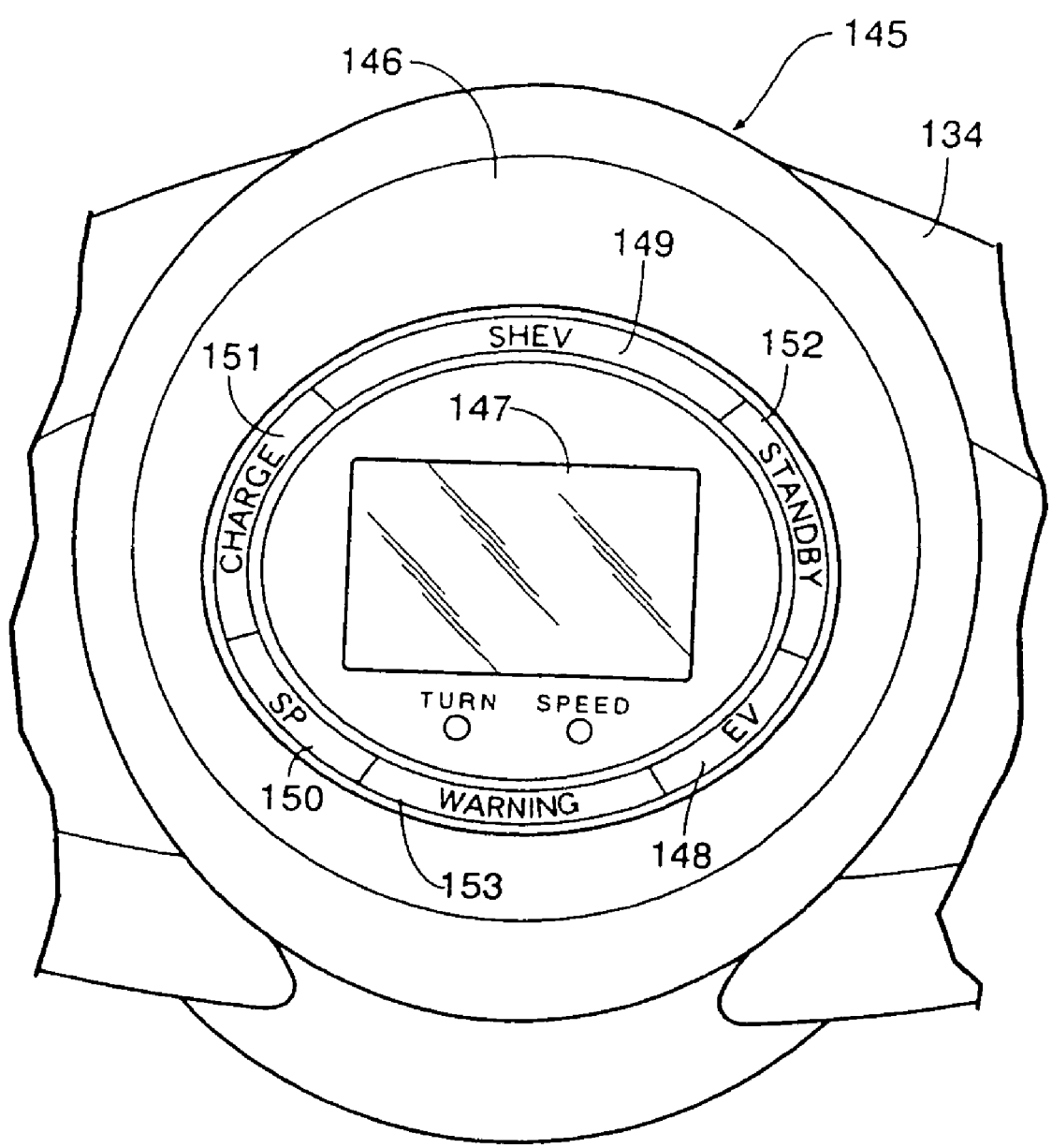
FIG. 8 is an enlarged view of a portion indicated with arrow 8 in FIG. 6.

Referring to FIG. 8, an indicator device 145 is disposed in the central portion of the handlebar cover 134. In the indicator device 145, on a common display surface 146 are arranged a speed indicator section 147, a plurality of driving mode indicator sections 148, 149, 150, and vehicle condition indicator sections 151, 152, 153. The speed indicator section 147 indicates the traveling speed of the motorcycle. The driving mode indicator sections 148, 149, 150 individually indicate a plurality of traveling modes for the hybrid type motorcycle. The vehicle condition indicator sections 151, 152, 153 indicate the operating conditions of the motorcycle.

The common display surface 146 is formed in a circular shape. The driving mode indicator sections 148 to 150 and the vehicle condition indicator sections 151 to 153 are each formed substantially in a circular arc shape so as to indicate the corresponding vehicle condition with lighting. In addition, they are disposed around the speed indicator section 147 to be endlessly continued into a circular arc shape. Further, the driving mode indicator sections 148 to 150 and the vehicle condition indicator sections 151 to 153 have respective display colors different from one another.

Incidentally, the plurality of traveling mode indicator sections 148 to 150 are indicator sections that indicate electric traveling mode (EV mode), series hybrid mode (SHEV mode), and sport mode (SP mode), respectively. In the EV mode, the motorcycle runs on the electric motor 20 only. In the SHEV mode, the motorcycle runs on the electric motor 20 driven by the power generated by the ACG starter motor 40 which is driven by the engine E. The vehicle operating condition indicator sections 151 to 153 indicate a battery charge state, a standby state and a warning state, respectively.

The function of the embodiment will be next described. The air cleaner 89, the exhaust muffler 96, and the rear wheel WR are covered by the common cover 125. The air cleaner 89 is at least part of the air intake system 88 continuous with the engine E capable of providing power to the rear wheel WR. The exhaust muffler 96 constitutes part of the exhaust system 94 continuous with the engine E. The cover 125 shields the electric motor 20 capable of providing power to the rear wheel WR, and the transmission case 50 housing the electric motor 20. Therefore, a noise reduction effect can be achieved that noise occurring in the air intake system 88 and the exhaust system 94 is prevented from leaking to the outside as much as possible. In addition, another noise reduction effect can be achieved that also noise occurring in the electric motor 20 is prevented from leaking to the outside as much as possible. Further, the transmission case 50 is covered with the cover 125 and the external appearance designing performance can be enhanced.

The rotational axis of the electric motor 20 extending in the longitudinal direction of the body frame F is disposed forward of the central position C of the exhaust muffler 96 extending in the longitudinal direction. Therefore, heat generated by the exhaust muffler 96 can be prevented from affecting the electric motor 20 as much as possible.

The electric motor 20 and the exhaust muffler 96 are disposed at respective locations to sandwich the rear wheel WR therebetween from both sides. Therefore, the heat generated by the exhaust muffler 96 can be prevented from affecting the electric motor 20 more effectively.

The exhaust muffler 96 includes the first expansion chamber 109 which receives exhaust gas from the engine E and the second expansion chamber 110 which is disposed above the first expansion chamber in such a manner as to receive the exhaust gas from the first expansion chamber 109. The lower portion of the first expansion chamber 109 is located at a position above and close to the lower opening edge of the right cover portion 125c of the cover 125. Therefore, flowing air can cool the exhaust muffler. This can further suppress the influence of the heat from the exhaust muffler 96 on the electric motor 20 to a low level.

The transmission case 50 of the power unit P holds the electric motor 20 with at least a portion of the motor case 71 for the electric motor 20 exposed to the outside. The left cover portion 125b of the cover 125 for covering the transmission case 50 is provided with the air intake and exhaust vents 126, 127 to cool with flowing air a portion of the motor case 71 that is exposed from the transmission case 50. Consequently, it is possible to direct flowing air into the inside of the cover 125, thereby effectively cooling the electric motor 20.

In addition, the air intake vent 126 is provided in the left cover portion 125b of the cover 125 at a location forward of the electric motor 20 in the vehicle traveling direction. The air exhaust vent 127 is provided in the left cover portion 125b of the cover 125 at a location rearward of the electric motor 20 in the vehicle traveling direction. As a result, flowing air is directed from the air intake vent 126 inside the cover 125 on the front side of the electric motor 20 along the vehicle traveling direction. Then, the flowing air that has passed the side surface of the motor case 71 is discharged from the exhaust vent 127 rearward of the electric motor 20 to the outside. It is therefore possible to cool the electric motor 20 more effectively.

The left cover portion 125b of the cover 125 is provided with a guide recess 130 at a portion forward of the electric motor 20 in the vehicle traveling direction. The guide recess 130 is recessed inwardly such that its amount of recess is increased as it approaches the rearward. In addition, the air intake vent 126 is disposed to be continuous with the rear end of the guide recess 130. Consequently, flowing air is directed into the air intake vent 126 through the guide recess 130 of the cover 125. In other words, flowing air can be effectively directed into the inside of the cover 125 without a portion projecting from the outer surface of the cover 125. Accordingly, while downsizing the cover 125 as a whole, flowing air can be effectively introduced to the side of the electric motor 20, thereby effectively cooling the electric motor 20.

In addition, the electric motor 20 is disposed such that at least a portion of the motor case 71 is exposed to the outside from the side surface of the transmission case 50, on the left side in the width direction of the body frame F. The air intake and exhaust vents 126, 127 are provided at the side surface of the cover 125 facing the left side in the width of the body frame F. Accordingly, air passing along the side surface of the cover 125 can be introduced, as flowing air, into the inside of the cover 125, on the left side in the width direction of the body frame F. The flowing air can thus cool the electric motor 20 furthermore effectively.

Incidentally, the indicator device 145 is disposed in the central portion of the handlebar cover 134, which covers the steering handlebar 16 but not grips 132, 133 located at both the ends of the steering handlebar. The indicator device 145 includes, on the common display surface 146, the speed indicator section 147, the plurality of driving mode indicator sections 148, 149, 150, and the vehicle condition indicator sections 151, 152, 153. The speed indicator section 147 indicates the traveling speed of the motorcycle. The driving mode indicator sections 148, 149, 150 individually indicate the plurality of traveling modes of the motorcycle. The vehicle condition indicator sections 151, 152, 153 indicate the operating conditions of the motorcycle. The driving mode indicator sections 148 to 150 and the vehicle condition indicator sections 151 to 153 are disposed around the speed indicator section 147 to be endlessly continued into a circular arc shape.

With such an indicator device 145, the traveling speed, the plurality of traveling modes and the vehicle operating conditions can be easily recognized with the reduced displacement of visual line. In addition, it is possible to effectively layout each of the indicator section 147, 148 to 150, and 151 to 153.

The plurality of traveling mode indicator sections 148 to 150, and vehicle condition indicator sections 151 to 153 are each formed in a substantially arc shape. It is therefore possible to get a relatively large area for each of the indicator sections 148 to 150 and 151 to 153. This makes it possible to allow the rider to visibly recognize the vehicle's operating conditions and traveling modes more effectively.

Additionally, the traveling mode indicator sections 148 to 150 and the vehicle condition indicator sections 151 to 153 have respective indicator colors different from one another. Therefore, this can allows the rider to visibly recognize the vehicle's operating conditions and traveling modes more clearly.

Further, the motorcycle of the present embodiment is of a hybrid type having the engine E as well as the electric motor 20. The traveling mode indicator sections 148 to 150 are adaptable to the electric traveling mode (EV mode), series hybrid mode (SHEV mode), and sport mode (SP mode), respectively. In the EV mode, the motorcycle runs on the electric motor 20 only. In the SHEV mode, the motorcycle runs on the electric motor 20 driven by the power generated by the ACG starter motor 40 which is driven by the engine E. More specifically, in the scooter-type motorcycle having many traveling modes because of the hybrid type, the indicator section 147, 148 to 150 and 151 to 153 in the indicator device 145 can be effectively arranged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A noise reduction structure for a hybrid vehicle comprising:
    a rear fender which covers at least part of left and right sides of an air intake system connected to an engine capable of giving power to a rear wheel of the vehicle, at least part of left and right sides of an exhaust muffler constituting part of an exhaust system connected to the engine, and at least part of left and right sides of an electric motor capable of giving power to the rear wheel,
    wherein a rotational axis of the electric motor extends in a direction that is perpendicular to a body frame, the rotational axis being disposed forward of a central position of the exhaust muffler extending in a longitudinal direction of the body frame,
    wherein the exhaust muffler includes a first case and a second case, the second case being directly joined to an upper surface of the first case, and
    wherein a left side of the rear fender is formed with a circular opening at a portion corresponding to the electric motor.

2. The noise reduction structure for a hybrid vehicle according to claim 1, wherein the exhaust muffler includes a first expansion chamber which receives exhaust gas from the engine and a second expansion chamber which is disposed above the first expansion chamber in such a manner as to receive the exhaust gas from the first expansion chamber, and a lower portion of the first expansion chamber is located at a position close to a lower opening edge of the rear fender.

3. The noise reduction structure for a hybrid vehicle according to claim 2, wherein exhaust gas is introduced by a first conduit into the first expansion chamber, the first conduit being composed of first and second straight portions, and a bent portion, which are integral with one another.

4. The noise reduction structure for a hybrid vehicle according to claim 3, wherein the first and second straight portions extend parallel to the axis of the exhaust muffler, the bent portion extends in a U-shaped manner to join the first straight portion with the second straight portion, and a downstream end of the second straight portion opens into the first expansion chamber.

5. The noise reduction structure for a hybrid vehicle according to claim 2, wherein the exhaust gas that has been introduced into the first expansion chamber is introduced into the second expansion chamber through a second conduit, the second conduit being formed in a substantially C-shape.

6. The noise reduction structure for a hybrid vehicle according to claim 2, wherein the exhaust gas that has been introduced into the second expansion chamber through a second conduit is introduced into a third expansion chamber through a third conduit, the third conduit being formed substantially in a J-shape and having a downstream end thereof which opens to the third expansion chamber.

7. The noise reduction structure for a hybrid vehicle according to claim 1, wherein one side of the rear fender is provided with a guide recess at a portion forward of the electric motor in a traveling direction of the vehicle, the guide recess being recessed inwardly such that an amount of the guide recess increases in a rearward direction, and
    wherein an air intake vent is disposed to be continuous with a rear end of the guide recess so that flowing air is directed into the air intake vent through the guide recess of the rear fender, and an air exhaust vent is provided at a location rearward of the electric motor in the traveling direction of the vehicle,
    wherein an air flow is directed from the air intake vent on the front side of the electric motor, along a side surface of the electric motor, and then is discharged from the air exhaust vent rearward of the electric motor to an outside.

8. The hybrid vehicle according to claim 1, wherein the air intake system and the exhaust muffler are disposed adjacent to the rear wheel so as to sandwich the rear wheel from both sides thereof.

9. The hybrid vehicle according to claim 1, wherein the first case is made up of a cylindrical body extending in the longitudinal direction, and the second case is made up of a pair of case halves that are joined together along a joint surface extending along the longitudinal direction of the motorcycle.

10. A hybrid vehicle having a noise reduction structure, comprising:
    an engine and an electric motor, each capable of giving power to a rear wheel; and
    a rear fender covering at least part of left and right sides of an air intake system connected to the engine, at least part of left and right sides of an exhaust muffler constituting part of an exhaust system connected to the engine, and at least part of left and right sides of the electric motor,
    wherein a rotational axis of the electric motor extends in a direction that is perpendicular to a body frame, the rotational axis being disposed forward of a central position of the exhaust muffler extending in a longitudinal direction of the body frame, wherein the exhaust muffler includes a first case and a second case, the second case being directly joined to an upper surface of the first case.

11. The hybrid vehicle according to claim 10, wherein the electric motor and the exhaust muffler are disposed at respective locations to sandwich the rear wheel therebetween from both sides thereof.

12. The hybrid vehicle according to claim 10, wherein the exhaust muffler includes a first expansion chamber which receives exhaust gas from the engine and a second expansion chamber which is disposed above the first expansion chamber in such a manner as to receive the exhaust gas from the first expansion chamber, and a lower portion of the first expansion chamber is located at a position close to a lower opening edge of the rear fender.

13. The hybrid vehicle according to claim 11, wherein the exhaust muffler includes a first expansion chamber which receives exhaust gas from the engine and a second expansion chamber which is disposed above the first expansion chamber in such a manner as to receive the exhaust gas from the first expansion chamber, and a lower portion of the first expansion chamber is located at a position close to a lower opening edge of the rear fender.

14. The hybrid vehicle according to claim 12, wherein exhaust gas is introduced by a first conduit into the first expansion chamber, the first conduit being composed of first and second straight portions, and a bent portion, which are integral with one another.

15. The hybrid vehicle according to claim 14, wherein the first and second straight portions extend parallel to the axis of the exhaust muffler, the bent portion extends in a U-shaped manner to join the first straight portion with the second straight portion, and a downstream end of the second straight portion opens into the first expansion chamber.

16. The hybrid vehicle according to claim 12, wherein the exhaust gas that has been introduced into the first expansion chamber is introduced into the second expansion chamber through a second conduit, the second conduit being formed in a substantially C-shape.

17. The hybrid vehicle according to claim 12, wherein the exhaust gas that has been introduced into the second expansion chamber through a second conduit is introduced into a third expansion chamber through a third conduit, the third conduit being formed substantially in a J-shape and having a downstream end thereof which opens to the third expansion chamber.

18. The hybrid vehicle according to claim 10, wherein one side of the rear fender is provided with a guide recess at a portion forward of the electric motor in a traveling direction of the vehicle, the guide recess being recessed inwardly such that an amount of the guide recess increases in a rearward direction, and wherein an air intake vent is disposed to be continuous with a rear end of the guide recess so that flowing air is directed into the air intake vent through the guide recess of the rear fender, and an air exhaust vent is provided at a location rearward of the electric motor in the traveling direction of the vehicle, wherein an air flow is directed from the air intake vent on the front side of the electric motor, along a side surface of the electric motor, and then is discharged from the air exhaust vent rearward of the electric motor to an outside.

19. The hybrid vehicle according to claim 10, wherein the air intake system includes an air cleaner having a lower surface that has a concave lower surface that extends from a top portion of the electric motor to a rear portion of the electric motor to a position that is rearward of and below the rotational axis of the electric motor, and wherein the air cleaner includes an upper surface that has a convex shape that substantially follows a concave shape of the cover and a convex shape of the driving wheel from a position atop of the driving wheel to position at a rear of the rear wheel.

20. The hybrid vehicle according to claim 10, wherein the first case is made up of a cylindrical body extending in the longitudinal direction, and the second case is made up of a pair of case halves that are joined together along a joint surface extending along the longitudinal direction of the motorcycle.

* * * * *